(12) United States Patent
Wager et al.

(10) Patent No.: US 9,148,269 B2
(45) Date of Patent: *Sep. 29, 2015

(54) METHOD AND ARRANGEMENT IN A WIRELESS COMMUNICATION SYSTEM

(71) Applicant: Optis Wireless Technology, LLC, Plano, TX (US)

(72) Inventors: Stefan Wager, Espoo (FI); Magnus Stattin, Sollentuna (SE)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,344

(22) Filed: Sep. 15, 2014

(65) Prior Publication Data
US 2015/0003383 A1     Jan. 1, 2015

Related U.S. Application Data

(63) Continuation of application No. 13/500,174, filed as application No. PCT/SE2010/050277 on Mar. 12, 2010, now Pat. No. 8,837,411.

(60) Provisional application No. 61/248,695, filed on Oct. 5, 2009.

(51) Int. Cl.
| | |
|---|---|
| *H04W 4/00* | (2009.01) |
| *H04L 5/00* | (2006.01) |
| *H04L 1/18* | (2006.01) |
| *H04W 74/08* | (2009.01) |
| *H04W 72/04* | (2009.01) |
| *H04W 28/04* | (2009.01) |
| *H04W 72/12* | (2009.01) |

(52) U.S. Cl.
CPC ............ *H04L 5/0055* (2013.01); *H04L 1/1812* (2013.01); *H04L 1/1822* (2013.01); *H04L 1/1825* (2013.01); *H04L 1/1861* (2013.01); *H04L 1/1887* (2013.01); *H04W 72/042* (2013.01); *H04W 74/08* (2013.01); *H04W 74/0833* (2013.01); *H04W 28/04* (2013.01); *H04W 72/1289* (2013.01)

(58) Field of Classification Search
CPC ..................................................... H04L 1/1812
USPC ......................................................... 370/329
See application file for complete search history.

(56) References Cited

U.S. PATENT DOCUMENTS

| | | | | |
|---|---|---|---|---|
| 8,837,411 | B2 * | 9/2014 | Wager et al. .................. | 370/329 |
| 2009/0213818 | A1 * | 8/2009 | Park et al. ..................... | 370/336 |
| 2009/0219874 | A1 * | 9/2009 | Yokoyama .................... | 370/329 |
| 2010/0070816 | A1 * | 3/2010 | Park et al. ..................... | 714/748 |
| 2010/0157962 | A1 * | 6/2010 | Koo et al. ..................... | 370/338 |

* cited by examiner

*Primary Examiner* — Maharishi Khirodhar
(74) *Attorney, Agent, or Firm* — Vincent J. Allen; Stephen Y. Liu; Carstens & Cahoon, LLP

(57) ABSTRACT

The present invention relates to a method and arrangement in base station for scheduling user equipments. The base station is adapted to schedule communication from user equipments by sending contention based grants comprising information indicating if the contention based grant should be used for initial transmission or for retransmission. If it is detected that data is not correctly received due to a collision, the information in a following contention based grant is set to indicate that said contention based grant is to be used for initial transmission, while if data is not correctly received, but no collision is detected, the information is set to indicate that the contention based grant is to be used for retransmission. Corresponding method and arrangement in a user equipment is described.

20 Claims, 8 Drawing Sheets

METHOD AND ARRANGEMENT IN A WIRELESS COMMUNICATION SYSTEM

1. CROSS-REFERENCE TO RELATED APPLICATIONS

This application is a continuation of co-pending U.S. application Ser. No. 13/500,174, filed on Apr. 4, 2012 entitled "Method and Arrangement in a Wireless Communication System," which is a 371 filing of International Application No. PCT/SE2010/050277 filed on Mar. 12, 2010 entitled "Method and Arrangement in a Wireless Communication System," the technical disclosures of which are hereby incorporated herein by reference in their entirety.

TECHNICAL FIELD

The present invention relates to a method and an arrangement in a base station and a method and an arrangement in a user equipment. In particular, it relates to a mechanism for scheduling user equipments within a wireless communication system adapted for contention based transmissions.

BACKGROUND

Hybrid Automatic Repeat reQuest (HARQ) with soft combining is an effective way to correct transmission errors in systems involving wireless transmission. HARQ is a variation of standard Automatic Repeat reQuest (ARQ), where an error detection code is used to detect transmission errors, and in the case errors are detected, the packet is requested for retransmission.

The basic idea of HARQ, for uplink transmission, is that after receiving data in an uplink subframe the base station, in LTE referred to as evolved NodeB (eNodeB or eNB), attempts to decode the data and then reports to the user equipment whether the decoding was successful by sending an acknowledgement (ACK) or unsuccessful by sending a negative acknowledgement (NACK). In the case of an unsuccessful decoding attempt, the user equipment thus receives a NACK in a later downlink subframe, and can retransmit the data that was not successfully received at the eNB.

HARQ with soft combining, sometimes referred to as Type II HARQ, uses Forward Error Correction to correct transmission errors from successive (re-)transmissions. The receiver stores soft copies of each failed transmission attempt. By combining the soft copies of each transmission attempt, the receiver has an increasing probability of correct decoding of the original packet. With type II HARQ, the receiver is thus able to use the cumulative energy of each transmission attempt. With plain ARQ, each retransmission attempt is decoded standalone, and thus does not have this gain.

Contention based uplink transmissions is a new technique that is being discussed in 3rd Generation Partnership Project (3GPP) for the Release 10 version of Long Term Evolution (LTE). The purpose is to reduce access delay and signalling overhead by letting user equipments transmit data on contention based (CB) grants. Contention based grants are signalled on Physical Downlink Control Channel (PDCCH) in the same way as dedicated uplink grants, but the grants are addressed to a group of users. User equipments can use the contention based grants to transmit data without prior transmission of Scheduling Request. Thus, the access time is reduced. Contention Based transmission may be feasible for users that have uplink synchronization. Contention based grants are addressed to Contention based Radio Network Temporary Identifiers, RNTIs, (CB-RNTIs). However, since many user equipments can use the same contention based grant, it is difficult to use the Hybrid Automatic Resend reQuest (HARQ) protocol to correct transmission errors, since typically errors are caused by interference from other user equipment sending data at the same time.

In the case of a decoding error in a contention based transmission scheme, the eNB will not be able to determine the identity of the transmitting user equipment. The eNB will therefore not be able to correctly combine (re-)transmissions from different user equipments transmitting of the same grant. Thus, the HARQ operation is not feasible to correct transmission errors caused by collision. Given the fixed retransmission timing used in e.g. High Speed Packet Access (HSPA) and LTE, retransmissions would only cause a new collision. However, when there is no collision, i.e. only one UE is transmitting, HARQ can effectively be used to correct transmission error, in the same way as it is used for dedicated grants.

Yet, having a retransmission scheme would significantly improve the performance in the cases where the transmissions are not successful.

In addition, a missed assignment will in general result in block errors that need to be corrected by higher-layer protocols, which in turn has a negative impact on performance in terms of throughput and latency. Also, increasing the delay may cause undesirable interactions with Transmission Control Protocol (TCP) based applications.

SUMMARY

It is therefore an object of the present invention to provide a mechanism for improving the performance in a wireless communication system.

According to a first aspect of the present invention, the object is achieved by a method in a base station for scheduling user equipments in a cell. The base station and the user equipments are comprised in a wireless communication system adapted for contention based transmissions. The base station is adapted to schedule the communication from the user equipments by sending contention based grants. The method comprises sending a contention based grant of a retransmission process to a plurality of user equipments within the cell, receiving data from at least one user equipment using said contention based grant and verifying if data is correctly received from at least one user equipment. If it is verified that data is not correctly received, the method comprises sending a non-acknowledgement feedback "NACK" to the plurality of user equipments. The method furthermore comprises detecting if data is not correctly received due to a collision, and sending a following, or second contention based grant belonging to the same retransmission process as the first contention based grant, to the plurality of user equipments. A contention based grant according to embodiments of the invention comprises information indicating if the contention based grant should be used for initial transmission or for retransmission. If it is detected that data is not correctly received due to a collision, the information in the following contention based grant is set to indicate that said contention based grant is to be used for initial transmission. If data is not correctly received, but no collision is detected, the information in the following contention based grant is set to indicate that said contention based grant is to be used for retransmission, such as Hybrid Automatic Repeat Request HARQ retransmission.

Hereby, if it is detected that data is not correctly received due to a collision, the information in the next contention based grant is set to indicate that said contention based grant is to be used for initial transmission. Otherwise, if data is not correctly received, but no collision is detected, the information in said contention based grant is set to indicate that the second contention based grant is to be used for retransmission, such as e.g. a Hybrid Automatic Repeat Request HARQ retransmission.

According to a first embodiment of the first aspect, the information indicating if the contention based grant should be used for initial transmission or for retransmission is provided as a state bit indicator where a first value indicates that the contention based grant should be used for initial transmission and a second value indicates that the contention based grant should be used for retransmission. Said state bit indicator is in a specific embodiment a New Data Indicator, NDI.

According to an alternative embodiment, the information indicating if the contention based grant should be used for initial transmission or for retransmission is provided as an identifier used to address the plurality of user equipments. Said identifier may be a Contention Based—Radio Network Temporary Identifier "CB-RNTI", wherein different CB-RNTIs are used for indicating if the contention based grant should be used for initial transmission or for retransmission.

According to a second aspect of the present invention, the object is achieved by an arrangement in a base station for scheduling user equipments in a cell. The base station and the user equipments are comprised in a wireless communication system adapted for contention based transmissions. The base station is adapted to schedule the communication from the user equipments by sending contention based grants. The arrangement comprises a transmitter, adapted to send contention based grants and to send feedback to a plurality of user equipments within the cell. The arrangement furthermore comprises a receiver, adapted to receive data from at least one user equipment and a verification unit adapted to verify if data is correctly received from at least one user equipment. The arrangement furthermore comprises a detecting unit adapted to detect if data is not correctly received due to a collision. The arrangement furthermore comprises a determination unit adapted to generate feedback and set information comprised in a following, or second contention based grant. If data is not correctly received, and a collision is detected, the information in the following, or second, contention based grant is set to indicate that said contention based grant is to be used for initial transmission. If data is not correctly received, but no collision is detected, the information in the following, or second, contention based grant is set to indicate that said contention based grant is to be used for retransmission.

According to a third aspect of the present invention, the object is achieved by a method in a user equipment for assisting a base station in scheduling user equipments in a cell. The base station and the user equipments are comprised in a wireless communication system adapted for contention based transmissions and the user equipment is adapted to receive contention based grants from the base station. The method comprising receiving a contention based grant from the base station, wherein the contention based grant comprises information indicating if the contention based grant should be used for initial transmission or retransmission. The method further comprises detecting the information comprised in said contention based grant, and sending data to the base station using said contention based grant, in accordance with the indication of the information comprised in the contention based grant.

Thus, the information comprised in the received contention based grant indicates if the contention based grant should be used for initial transmission or for retransmission. The data to be sent to the base station is initial transmission data or retransmission data, depending on the detected information comprised in the received contention based grant.

According to a first embodiment of the second aspect, the information indicating if the contention based grant should be used for initial transmission or for retransmission is provided as a state bit indicator where a first value indicates that the contention based grant should be used for initial transmission and a second value indicates that the contention based grant should be used for retransmission. Said state bit indicator is in a specific embodiment a New Data Indicator, NDI.

According to an alternative embodiment, the information indicating if the contention based grant should be used for initial transmission or for retransmission is provided as an identifier used to address the plurality of user equipments. Said identifier may be a Contention Based-Radio Network Temporary Identifier "CB-RNTI", wherein different CB-RNTIs are used for indicating if the contention based grant should be used for initial transmission or for retransmission According to a specific embodiment, if a non-acknowledgement feedback, NACK, is received and the information comprised in the following grant of the same retransmission process as the first grant indicates that the grant should be used for initial transmission, then the method comprises triggering a radio link control, RLC, retransmission. A specific embodiment comprises adding a random delay before the radio link control retransmission of data is performed.

According to yet another embodiment, if a NACK is received and the information comprised in the following contention based grant of the same retransmission process as the first contention based grant indicates that the grant should be used for retransmission, a retransmission of data, such as Hybrid Automatic Repeat Request "HARQ" retransmission should be performed.

According to yet another embodiment, the method comprises, if a NACK is received, activating a sending prohibit timer, which sending prohibit timer prevents the user equipment from using any grants received from the base station before the sending prohibit timer has timed out. The sending prohibit timer may be arranged to be deactivated when a dynamic grant, dedicated to the user equipment, is received.

According to a fourth aspect of the present invention, the object is achieved by an arrangement in a user equipment for assisting a base station in scheduling user equipments in a cell. The base station and the user equipments are comprised in a wireless communication system adapted for contention based transmissions. The user equipment is adapted to receive contention based grants from the base station. The arrangement comprises a receiver adapted to receive a contention based grant comprising information indicating if the contention based grant should be used for initial transmission or for retransmission and a detecting unit, adapted to detect said information. The arrangement furthermore comprises a transmitter, adapted to transmit data to the base station using said contention based grant, in accordance with the indication of the information comprised with the contention based grant.

Embodiments of the present methods and arrangements further improve the contention based concept. According to embodiments of the present methods and arrangements, the identity of the user equipment sending data does not need to be transmitted to the base station, which saves resources. Further, the overall reduced signalling resulting from the present methods and arrangements render higher capacity and better coverage within the wireless communication system. Thus the performance of the wireless communication system is improved.

An advantage of embodiments of the present methods and arrangements is that HARQ operation is supported for contention based transmission.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and an arrangement in a base station and a method and an arrangement in a user equipment, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not drawn to scale and that they are merely intended to conceptually illustrate the structures and procedures described herein.

Figure 1:
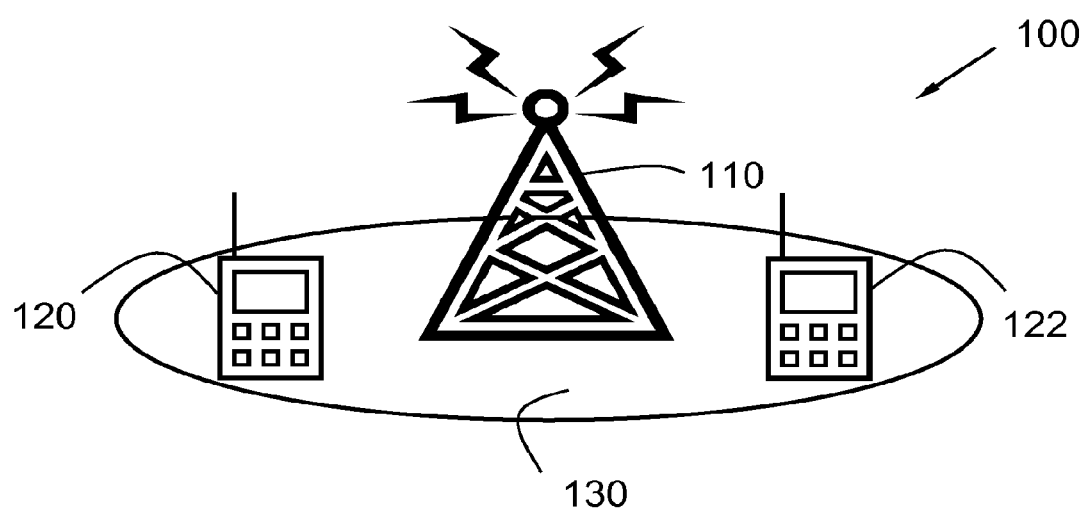
FIG. 1 is a schematic block diagram illustrating embodiments of a wireless communication system.

FIG. 1 depicts a wireless communication system 100, such as e.g. the E-UTRAN, LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some possible options.

The wireless communication system 100 may comprise a base station 110, a first user equipment 120 and a second user equipment 122 adapted to communicate with each other over at least one radio channel, within a cell 130. The wireless communication system 100 is adapted for a contention based transmission scheme.

The base station 110 may be referred to as e.g. a NodeB, an evolved Node B (eNode B, or eNB), a base transceiver station, Access Point Base Station, base station router, or any other network unit capable to communicate with the user equipment 120, 122 within the cell 130, depending e.g. of the radio access technology and terminology used. In the rest of the description, the term "base station" will be used, in order to facilitate the comprehension of the present methods and arrangements.

The user equipments 120, 122 may be represented by e.g. a wireless communication terminal, a mobile cellular phone, a Personal Digital Assistant (PDA), a wireless platform, a laptop, a computer or any other kind of device capable to communicate wirelessly with the base station 110. Further, the user equipments 120, 122 within the cell 130 may, according to some embodiments be grouped together in subsets of user equipments 120, 122, forming contention based groups.

In the following, the present methods and arrangements are further elaborated with specific reference to LTE systems and more particularly with respect to the uplink in LTE, i.e. for the link from the user equipment 120, 122 towards the base station 110. However, it is obvious to a skilled person that corresponding concepts could also be applied in other wireless communication systems 100.

A basic concept of a contention based transmission scheme is that user equipments 120, 122 are allowed to use uplink resource blocks in a contention based fashion. According to some embodiments, uplink resources that have not been allocated to any dedicated user equipment 120, 122, and would thus otherwise be left unused, may be offered for contention based grant. In this way, the resources for contention based access do not affect other scheduled uplink transmissions according to those embodiments.

A general property of contention based transmissions is that the error rate may increase if data packets collide with each other. Collisions reduce the transmission throughput and the throughput becomes sensitive to the system load. If the load is allowed to increase beyond a certain limit, the collision probability increases rapidly, the wireless communication system 100 may become unstable, and the throughput may decrease. Therefore, contention based transmissions may not interfere with dedicated transmissions, according to some embodiments. Thus, each allocated resource block may either be allocated for contention based transmission or dedicated transmission. One way to achieve such isolation is to allow contention based transmission only in uplink resource blocks that have not been reserved for dedicated uplink transmission.

Embodiments of the present methods and arrangements introduce adaptive retransmission operation such as e.g. HARQ retransmission operation, to the concept of contention based transmissions in LTE. The basic principle is to support HARQ retransmission when no collision is detected, but to refrain from HARQ retransmission if a collision is detected. Hereby, unwanted collisions of HARQ retransmissions can be avoided, while still using the HARQ gain to correct transmission errors not caused by collision. Thus, according to embodiments of the invention, the base station 110 is able to enable/disable HARQ retransmission at the user equipment 120, 122 dependent on if data was not correctly received due to a collision of data transmissions or not. If data was not correctly received due to a collision, a following contention based grant should only be used for initial transmission. Consequently, if data was not correctly received, but no collision has occurred, a following contention based grant should only be used for retransmission.

In a specific embodiment, the base station 110 may use a state bit such as e.g. the New Data Indicator (NDI) in the contention based grant to indicate to the user equipment 120, 122 whether to use the contention based grant for retransmission or not. The state bit, e.g. the NDI, may be set to a first value indicating that the contention based grant is to be used for initial transmission, or to a second value, indicating that the contention based grant is to be used for retransmission, such as e.g. a Hybrid Automatic Repeat Request HARQ retransmission. The first value may be 0 and the second value may be 1. However, according to same embodiments, the first value may be 1 and the second value may be 0. Thus the base station 110 is able to enable/disable HARQ retransmission at the user equipment 120, 122.

Alternatively, in another specific embodiment, whether or not to use the contention based grant for retransmission can be indicated with different CB-RNTIs for initial transmission and retransmission such that the base station 110 controls the HARQ operation by means of using different CB-RNTIs for indicating that the contention based grant is to be used for initial transmission and retransmission, e.g. HARQ retransmission, respectively. For example, providing an uplink contention based grant to a first CB-RNTI indicates that user equipment 120, 122 may only use the contention based grant for initial transmission. Providing an uplink grant to a second CB-RNTI indicates that the grant is only for retransmissions, i.e. only a user equipment 120, 122 that performed a transmission on the same HARQ process one RTT before and received a NACK is allowed to use the contention based grant to transmit a HARQ retransmission. In this way, user equipment 120, 122 wanting to initiate new transmission are blocked from using this contention based grant and the collision probability is decreased.

The present methods and arrangements may also make use of a Local NACK in the user equipment 120, 122. Thus upon receiving a NACK as a response to the contention based transmission, and the next received contention based grant comprises information indicating that the contention based grant is only to be used for initial transmission, the user equipment 120, 122 may perform a Local NACK from Medium Access Control (MAC) to Radio Link Control, RLC, to trigger an RLC retransmission. The idea is thus that the HARQ transmitter provides local NACK to the ARQ transmitter. The local NACK concept is known from e.g. Tdoc R2-060374. Furthermore, a random delay may optionally be added before the RLC transmission in order to spread the RLC retransmissions in time to avoid further collisions, according to some embodiments.

The MAC is situated in the protocol sub-layer above the physical layer and below the RLC layer in the LTE protocol stack. The connection to the physical layer below is through transport channels, and the connection to the RLC layer above is through logical channels. The MAC layer may perform data transmission scheduling and multiplexing/demultiplexing between logical channels and transport channels. In the user equipment 120, 122, it may also be responsible for control of random access, timing advance and discontinuous reception.

The RLC layer is located between the Packet Data Convergence Protocol (PDCP) layer and the MAC layer in the LTE user plane protocol stack. The main functions of the RLC layer are segmentation and reassembly of upper layer packets in order to adapt them to the size which can actually be transmitted over the radio interface. For radio bearers which need error-free transmission, the RLC layer also may perform retransmission to recover from packet losses. Additionally, the RLC layer may perform reordering to compensate for out-of-order reception due to HARQ operation in the MAC layer. There may be one RLC entity per radio bearer.

Figure 2:
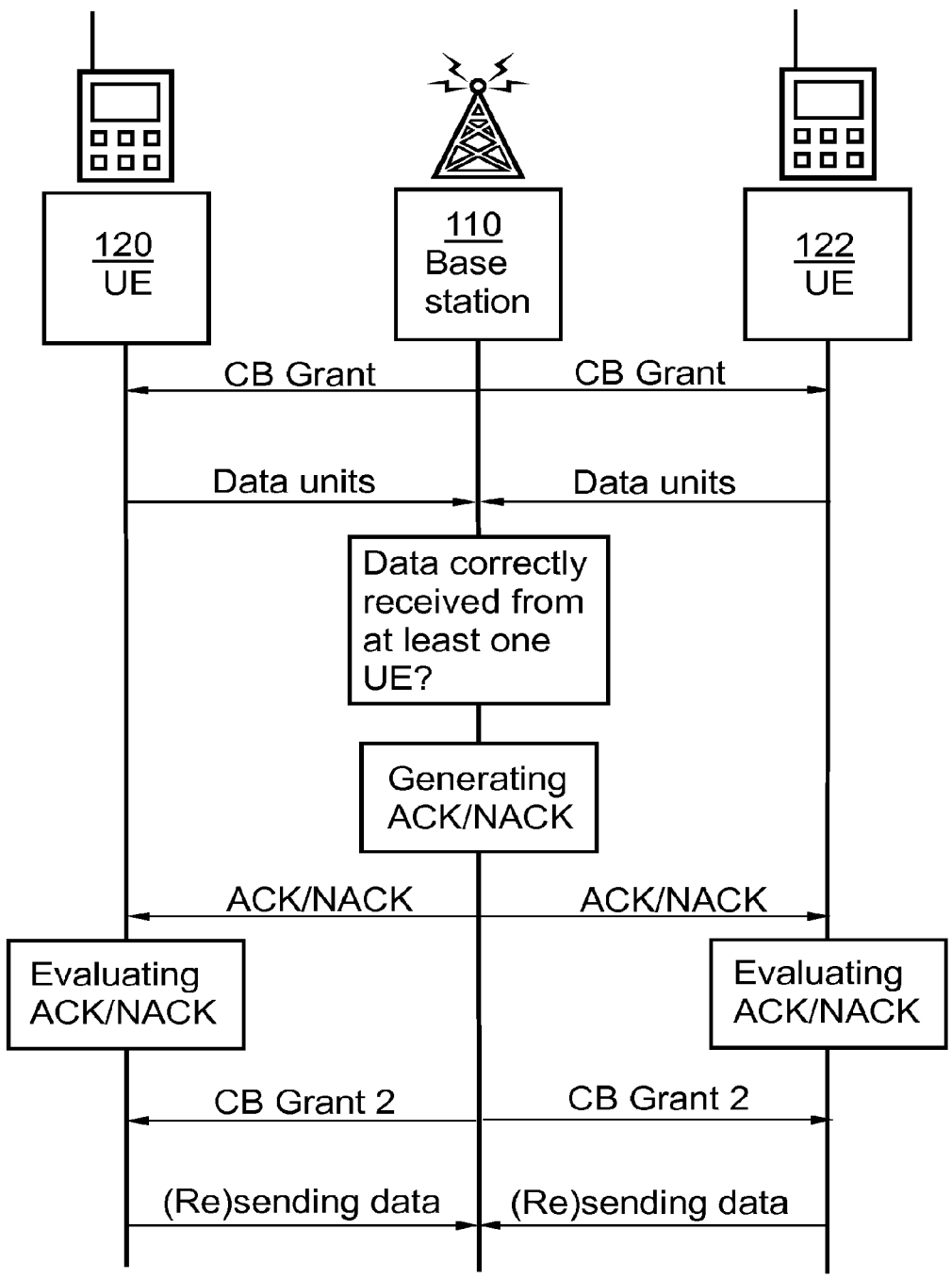
FIG. 2 is a combined signalling and flowchart illustrating radio signal transmission according to some embodiments.

FIG. 2 is a combined signalling and flowchart illustrating radio signal transmission according to some embodiments. The purpose of this illustration is to provide a general overview of the present methods and the functionalities involved.

The present methods and arrangements are related to a scenario comprising at least one user equipments 120, 122 in the cell 130 with uplink time alignment but no scheduling grant is allocated. The user equipment 120, 122 may receive data in its buffer, and the present methods and arrangements relates to how to minimize the latency for this data to be securely transmitted to the base station 110 over the air interface.

In a first step, the base station 110 schedules and sends a contention based grant to a plurality of user equipments 120, 122 within the cell 130. The contention based grant may be sent to all user equipments 120, 122 within the cell 130, or sent to a subset of user equipments 120, 122 within the cell 130, i.e. subsets of user equipments 120, 122 forming contention based groups, according to different embodiments. The contention based grant comprises information indicating if the grant should be used for initial transmission or for retransmission. The information may as previously explained be provided for example as a state bit that may be set, e.g. preset, to a first value or a second value, according to some embodiments.

The plurality of user equipments 120, 122 may optionally form contention based groups, which may be given access to different contention based resources. Thus for example, there may be a premium user contention based group and a regular user contention based group, just to mention an arbitrary example.

Thus any synchronized user equipments 120, 122 with uplink data but no valid grant can now read a contention based grant and use it to make a contention based data transmission, either an initial transmission or a retransmission in accordance with the information comprised in the grant.

When the base station 110 receives signalling from the user equipments 120, 122, the base station 110 may perform some verification of the correctness of the received data. Thus the base station 110 may attempt to decode the transport blocks in the uplink sub-frames in which it has detected an assignment and for example by means of a Cyclic Redundancy Check (CRC) estimate whether the transport block is correctly received or not.

If it is verified that data is correctly received from at least one of the user equipments 120, 122, then an acknowledgement ACK may be generated. If data is not correctly received by at least one of the user equipments 120, a negative acknowledgement, or non-acknowledgement NACK is generated.

Also, if data is not correctly received, a detection is made in order to find out if a collision of data transmissions has occurred. A collision may occur if two or more user equipments 120, 122 try to send signals simultaneously over the same resource, e.g. the same channel.

Also information is set to indicate if the grant should be used for initial transmission or for retransmission dependent on if a collision was detected. For example, if a collision is detected, a state bit, such as e.g. NDI, of the next grant to be sent is set to a first value, indicating that the next contention based grant is only to be used for initial transmission.

Else, if no collision has been detected, but data was still not correctly received, the information of the next grant to be sent is set to indicate that the next contention based grant is to be used for retransmission, such as e.g. a Hybrid Automatic Repeat Request HARQ retransmission. For example, a state bit such as e.g. NDI, of the next grant to be sent is set to a second value.

Thus, the present methods and arrangements minimize, or at least somewhat reduce wasting radio resources on redundant retransmissions.

The feedback ACK/NACK may be sent on the PHICH channel. PHICH is determined from the Control Channel Element (CCE) of the PDCCH carrying the contention based grant. However, in this case, all user equipments 120, 122 that used the contention based grant may also read the contention based feedback, ACK or NACK. Thus, the feedback according to the present methods and arrangements has a one to many mapping, instead of a one to one mapping that is usually assumed with HARQ feedback according to some embodiments.

Since the feedback will possibly be received by a plurality of user equipment 120, 122, there may be rules on what feedback to send, in case the feedback should in reality be different for different user equipment 120, 122 according to some embodiments.

The user equipments 120, 122 receiving the ACK or NACK feedback evaluate the feedback. If an ACK has been received, the user equipment 120, 122 regard the transmission as successful, and continues sending the next data whenever the subsequent grant, which may be yet a contention based grant or a dedicated grant, is detected according to some embodiments. If a NACK is received, the information comprised in the next received grant, for example a state bit, has to be further analysed. When next contention based grant is received from the base station 110, it is detected if the information comprised in the received contention based grant is set to indicate an initial transmission or a retransmission.

Then data may be sent, or alternatively resent, to the base station such that initial transmission data is sent if the information comprised in the contention based grant so indicates, e.g. a state bit is detected to be set to the first value, and retransmission data is sent if the information, based on that no collision was detected, is set to indicate retransmission, e.g. a state bit is detected to be set to the second value.

After the user equipment 120, 122 has received a NACK on PHICH, it can according to some embodiments be prohibited to use contention based resources for any data by means of a contention based uplink prohibit timer. This data can be RLC retransmission, or possibly some new data. The prohibit timer can be valid over a fixed time period or until the next dynamic grant for the user equipment's 120, 122 Cell Radio Network Temporary Identifier (C-RNTI). When the optional prohibit timer is running, the user equipment 120, 122 may be able to do a scheduling request on the Physical Uplink Control Channel (PUCCH).

The specific embodiment comprising the prohibit timer described above is particularly useful in the case where a collision was detected, but may also be applied in case a NACK is received but no collision was detected. In the collision scenario, the prohibit timer may for example constitute an alternative to the addition of a random delay before transmitting an RLC transmission.

In LTE systems, data unit reordering due to HARQ retransmissions may be corrected by the RLC layer. A reordering timer may be used to wait for potentially successful retransmissions in case a gap in received RLC sequence numbers is detected according to some embodiments. The transmission of a status report to request an RLC retransmission may be delayed until the timer expires, and cancelled if the retransmission was successful in the mean time. With contention based uplink, the reordering timer may be used if MAC level retransmissions are performed and soft combining is used. Else any gap may be due to loss of data.

According to some embodiments, a local NACK may be passed in the user equipment 120, 122 from the MAC layer to the RLC layer, i.e. the local NACK is given from MAC to RLC in the UE, which triggers an RLC retransmission of the lost data. As no variance in MAC transmission delay occurs, the reordering timer in the RLC receiver may not be needed. The RLC layer may also be made aware whether MAC layer retransmission is supported or not. RLC polling for status reports can also be optimized, or at least somehow improved, for contention based transmissions. The importance of the RLC polling mechanism is reduced if retransmissions are mostly triggered by local NACKs due to missing MAC ACK according to some embodiments. Accordingly, the optional poll timer may be reduced to a pure safeguard mechanism to prevent protocol stall, i.e. the value of the timer could be increased or the timer be switched off. Polling on empty buffer is then sufficient and could be triggered by checking the buffer status according to some embodiments.

Figure 3A:
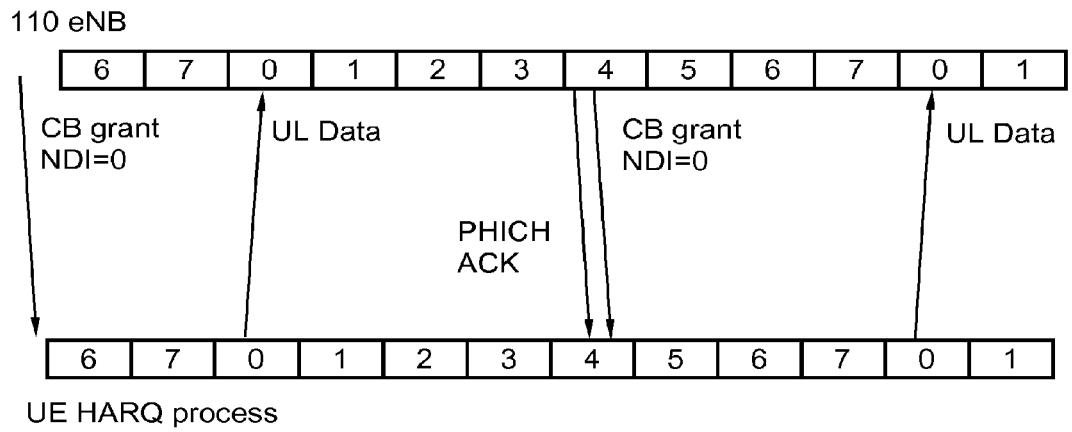
FIG. 3a is an illustration depicting an operation with successful radio signal transmission, according to some embodiments.

FIG. 3a is an illustration depicting an operation with successful radio signal transmission, according to some embodiments.

Data transmission on contention based grants may be scheduled on PDCCH by sending a contention based grant, addressed to a contention based-Radio Network Temporary Identifier CB-RNTI. Which CB-RNTIs each user equipment 120, 122 should listen to may be preconfigured with RRC. Once a user equipment 120, 122 has data in its buffer and detects a contention based grant, it may try to transmit its data in the corresponding uplink resource blocks, using the transport format indicated in the grant. Once the transmission is made, the user equipment 120, 122 monitors the Physical HARQ Indication Channel (PHICH) for the HARQ feedback of the uplink transmission. In case an ACK is received, the user equipment 120, 122 interprets the transmission as successful and may continue data transmission in the next contention based grant. Note that this description considers only HARQ process 0 in FIG. 3a. The user equipment 120, 122 may simultaneously perform transmission on the other HARQ processes as well, according to some embodiments.

Figure 3B:
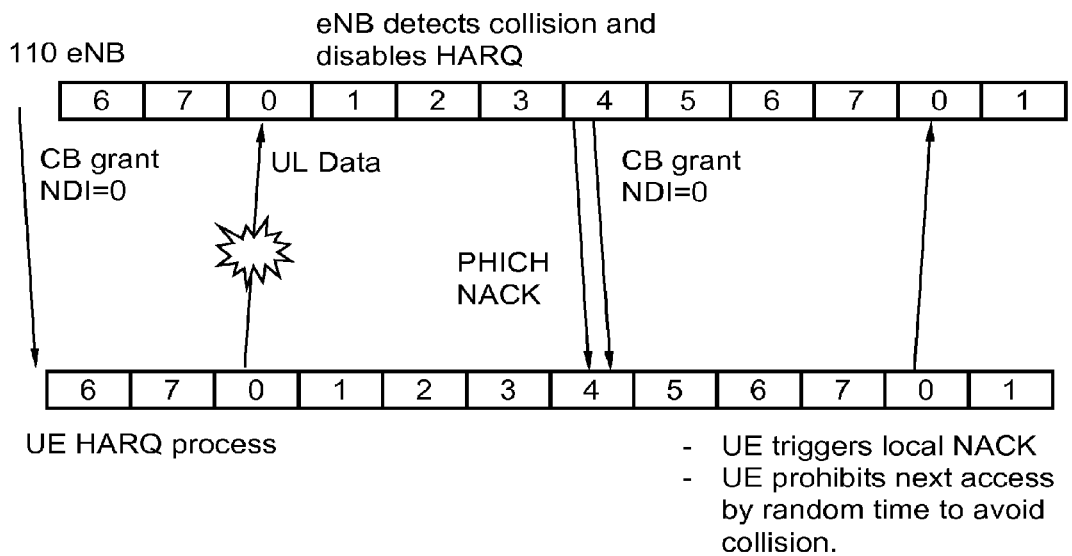
FIG. 3b is an illustration depicting unsuccessful radio signal transmission, according to some embodiments, due to collision.
Figure 3C:
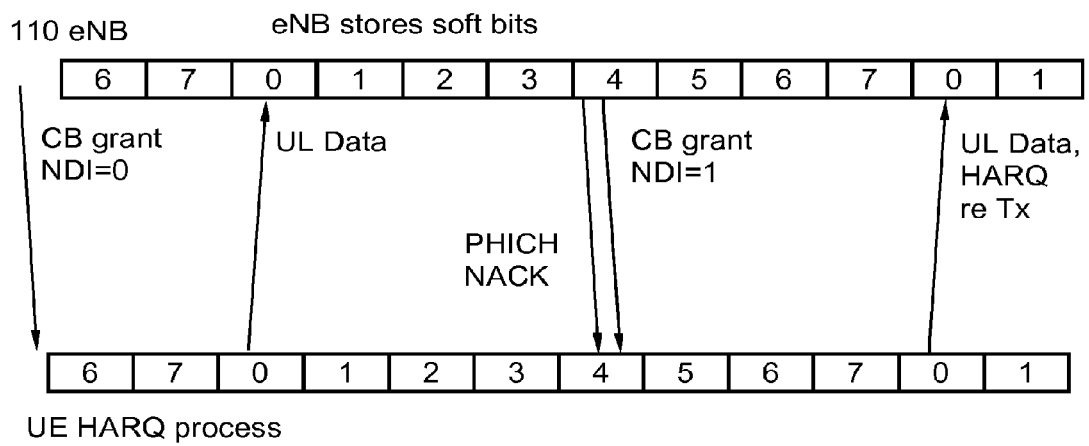
FIG. 3c is an illustration depicting unsuccessful radio signal transmission, according to some embodiments, but no collision is detected.

According to the embodiments illustrated in FIGS. 3a-c, the base station 110 controls the HARQ operation by using the NDI field in the contention based grant for providing information indicating if the contention based grant should be used for initial transmission or retransmission. Setting the NDI=0 may indicate that user equipment 120, 122 may only use the contention based grant for initial transmission, e.g. because a collision was detected. Setting the NDI=1 may indicate that the grant is only for HARQ retransmissions, i.e. only a user equipment 120, 122 that performed a transmission on the same HARQ process one Round Trip Time, RTT, before and received a NACK is allowed to use the contention based grant to transmit a HARQ retransmission. In this way, a user equipments 120, 122 wanting to initiate new transmission are blocked from using this contention based grant and the collision probability is decreased.

Note that the use of 0 and 1 may as well be reversed, such that setting the NDI=1 may indicate that user equipment 120, 122 may only use the contention based grant for initial transmission. Setting the NDI=0 may optionally indicate that the grant is only for HARQ retransmissions, i.e. only a user equipment 120, 122 that performed a transmission on the same HARQ process one RTT before and received a NACK is allowed to use the contention based grant to transmit a HARQ retransmission.

FIG. 3b is an illustration depicting unsuccessful radio signal transmission, according to some embodiments, due to collision.

The base station 110 in this specific embodiment uses the NDI bit to control the HARQ operation by enabling HARQ when it does not detect a collision, and to disable HARQ when a collision is detected. If the base station 110 detects a collision, it may set e.g. the NDI=0 in the next grant for the same HARQ process, to indicate to the accessing user equipments in the contention based group that they should not perform HARQ retransmission. Instead, the colliding user equipments 120, 122 may generate a local NACK to trigger a higher layer (RLC) retransmission. In addition, colliding user equipments 120, 122 may according to some embodiments implement a backoff time until accessing contention based grant again in order to avoid successive collisions, according to some embodiments.

FIG. 3c is an illustration depicting unsuccessful radio signal transmission (a NACK is sent), according to some embodiments, where no collision is detected.

If the base station 110 does not detect a collision, but the decoding of the received data fails, it orders the transmitting user equipment 120, 122 to perform a HARQ retransmission by providing a contention based grant with NDI=1 according to some embodiments and the same format as the initial transmission on the same HARQ process, see FIG. 3c.

In an alternative embodiment of the invention the base station 110 controls the HARQ operation by means of selecting different CB-RNTIs for indicating initial transmission and HARQ retransmission, respectively. Providing a contention based uplink grant to a first CB-RNTI indicates that user equipments 120, 122 may only use the contention based grant for initial transmission. Providing a contention based uplink grant to a second CB-RNTI indicates that the grant is only for HARQ retransmissions, i.e. only a user equipments 120, 122 that performed a transmission on the same HARQ process one RTT before and received a NACK is allowed to use the contention based grant to transmit a HARQ retransmission.

In this way, user equipments 120, 122 wanting to initiate new transmission are blocked from using this contention based grant and the collision probability is decreased.

The base station 110 can use different techniques to determine whether there was a collision on a contention based resource. A high received energy, but failed decoding could be interpreted as a collision. A low received energy, and increased noise could instead be interpreted as a power limited user equipment 120, 122, according to some embodiments. In the second case, HARQ retransmission may provide enough accumulated received energy to correctly decode the data. Another way to support collision detection may be to let user equipments 120, 122 use different reference symbols in their contention based transmissions. There will not be enough reference symbols for each user equipment 120, 122, but a randomly selected reference symbol may in some cases allow the base station 110 to detect a collision according to some embodiments.

A user equipment 120, 122 having data to transmit detects a contention based grant and then transmits the data on the contention based resources indicated in the grant. The user equipment 120, 122 may store the soft bits in the HARQ process buffer and then reads the HARQ feedback information on the PHICH resource indicated in the contention based grant. If the HARQ feedback indicates an ACK, the user equipment 120, 122 considers the transmission successful and flushes the HARQ process buffer. If the HARQ feedback indicates NACK, the user equipment 120, 122 reads the contention based grant corresponding to the next uplink subframe of the same HARQ process and determines what the information comprised in the contention based grant indicates, for example the value of the NDI bit.

If the information comprised in the contention based grant indicates that a transmission should not be performed, which for example may be indicated by an NDI set to 0, the user equipment 120, 122 flushes the HARQ process buffer and generates a local NACK to trigger RLC retransmission according to some embodiments. To avoid successive collisions, a network defined random backoff time, i.e. delay, may be applied according to some embodiments.

If the information comprised in the contention based grant indicates that a retransmission should be made, e.g. NDI bit is set to 1, the user equipment 120, 122 performs a HARQ retransmission in the contention based grant according to some embodiments. Note that the base station 110 must make sure the contention based grant is of same type as the initial grant so that the user equipment 120, 122 can perform the retransmission. In case there are several contention based grants in the same subframe, one way of distinguish the grants from each other is to define several contention based RNTIs, one for each contention based grant. The retransmission is then to be performed on the same CB-RNTI as the original transmission according to some embodiments.

As previously mentioned, in an alternative embodiment of the invention different CB-RNTIs are used for indicating initial transmission and HARQ retransmission. Receiving an uplink grant for a first CB-RNTI indicates that the user equipment 120, 122 may only use the contention based grant for initial transmission. Receiving an uplink grant for a second CB-RNTI indicates that a user equipment 120, 122 that performed a transmission on the same HARQ process one RTT before and received a NACK can use the contention based grant to transmit a HARQ retransmission.

Figure 4:
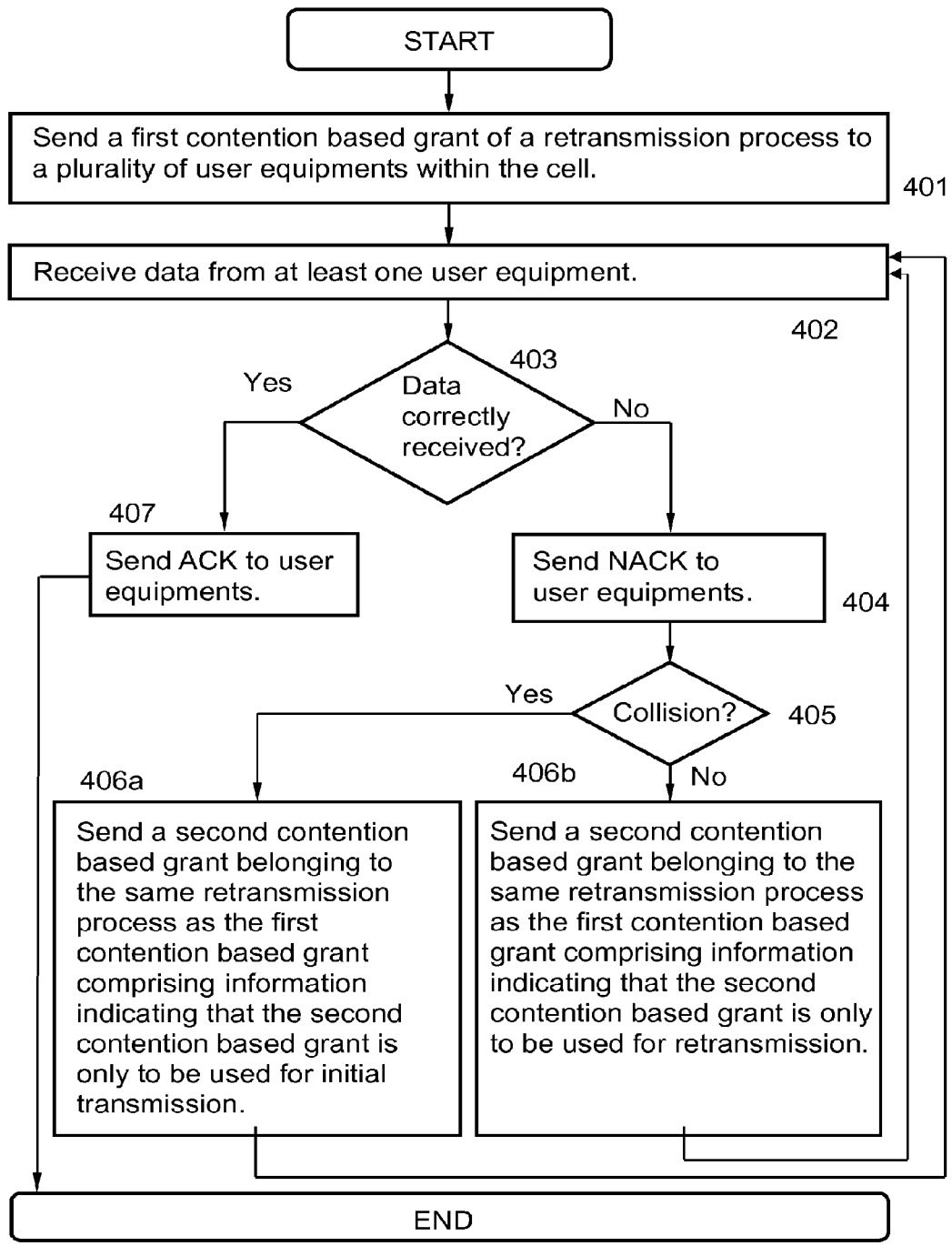
FIG. 4 is a flow chart illustrating embodiments of a method in a base station.

FIG. 4 is a flow chart illustrating embodiments of method steps 401-407 performed in a base station 110 for scheduling user equipments 120, 122 in a cell 130. The base station 110 and the user equipments 120, 122 are comprised in a wireless communication system 100. The wireless communication system 100 is adapted for contention based transmissions. The base station 110 is adapted to schedule communication from the user equipments 120, 122 by sending contention based grants. Each contention based grant comprises information indicating if the contention based grant should be used for initial transmission or for retransmission. The information may be e.g. a state bit, which state bits are adapted to be set to a first value or to a second value. The state bit may be e.g. a New Data Indicator NDI. Alternatively, the information may, as described above, be comprised in the selection of CB-RNTI. The base station 110 is adapted to serve a plurality of user equipments 120, 122 within the cell 130. The wireless communication system 100 may be e.g. a LTE radio network and the base station 110 may be e.g. an evolved node B, eNB, according to some embodiments.

Thus, if a collision is detected, the following contention based grant comprises information set to indicate that the contention based grant is to be used for initial transmission. Otherwise, if data is not correctly received, but no collision is detected, the information in the contention based grant is set to indicate that the contention based grant is to be used for retransmission, such as e.g. a Hybrid Automatic Repeat Request HARQ retransmission.

To appropriately scheduling user equipments 120, 122 within the cell 130, the method may comprise a number of method steps 401-407.

It is however to be noted that some of the described method steps are optional and only comprised within some embodiments. Further, it is to be noted that the method steps 401-407 may be performed in a somewhat different chronological order and that some of them, e.g. step 404 and step 405, may be performed simultaneously or in an altered chronological order. The method may comprise the following steps:

Step 401

A contention based grant is sent to a plurality of user equipments 120, 122 within the cell 130.

The plurality of user equipments 120, 122 within the cell 130 may optionally comprise a subset of all the user equipments 120, 122 within the cell 130. For example, some user equipments 120 may be comprised in a premium contention based group and some user equipments 122 may be comprised in a regular contention based group.

According to some embodiments, the plurality of user equipments 120, 122 within the cell 130 may optionally comprise all the user equipments 120, 122 within the cell 130.

The feedback ACK/NACK may according to some embodiments be sent over a Physical Hybrid Automatic Repeat Request Indicator Channel (PHICH).

Step 402

Data is received from at least one user equipment 120, 122.

Step 403

It is verified if data is correctly received from at least one user equipment 120, 122.

The data verification may comprise decoding, or attempting to decode the data and perform e.g. a cyclic redundancy check CRC, or any other appropriate data verification procedure.

Step 404

If it is verified that data is not correctly received a non-acknowledgement feedback NACK is sent to the plurality of user equipments 120, 122.

Step 405

If it is verified that data is not correctly received, it is detected if data is not correctly received due to a collision. If it is detected that data is not correctly received due to a collision, information is provided with the following contention based grant to indicate that said contention based grant should be used for initial transmission. The information may be provided as a state bit in the second, i.e. following contention based grant set to a first value, indicating that the said contention based grant is only to be used for initial transmission. Alternatively, the information is provided to the user equipments by the selection of a CB-RNTI used for the following contention based grant, indicating that said contention based grant is only to be used for initial transmission.

However, if data is not correctly received, but no collision is detected, the information in the following contention based grant is set to indicate that said contention based grant is only to be used for retransmission, such as e.g. a HARQ retransmission, e.g. a state bit in the second, i.e. following contention based grant is set to the second value, or a CB-RNTI is selected, to indicate that said contention based grant is only to be used for retransmission.

Step 406

A second, i.e. following contention based grant, belonging to the same retransmission process as the first contention based grant, is sent to the plurality of user equipments 120, 122 to be used in accordance with the information indicating if the contention based grant should be used for initial transmission or retransmission.

Step 407

If it is verified that data is correctly received, an acknowledgement feedback ACK may be sent to the plurality of user equipments 120, 122.

Figure 5:
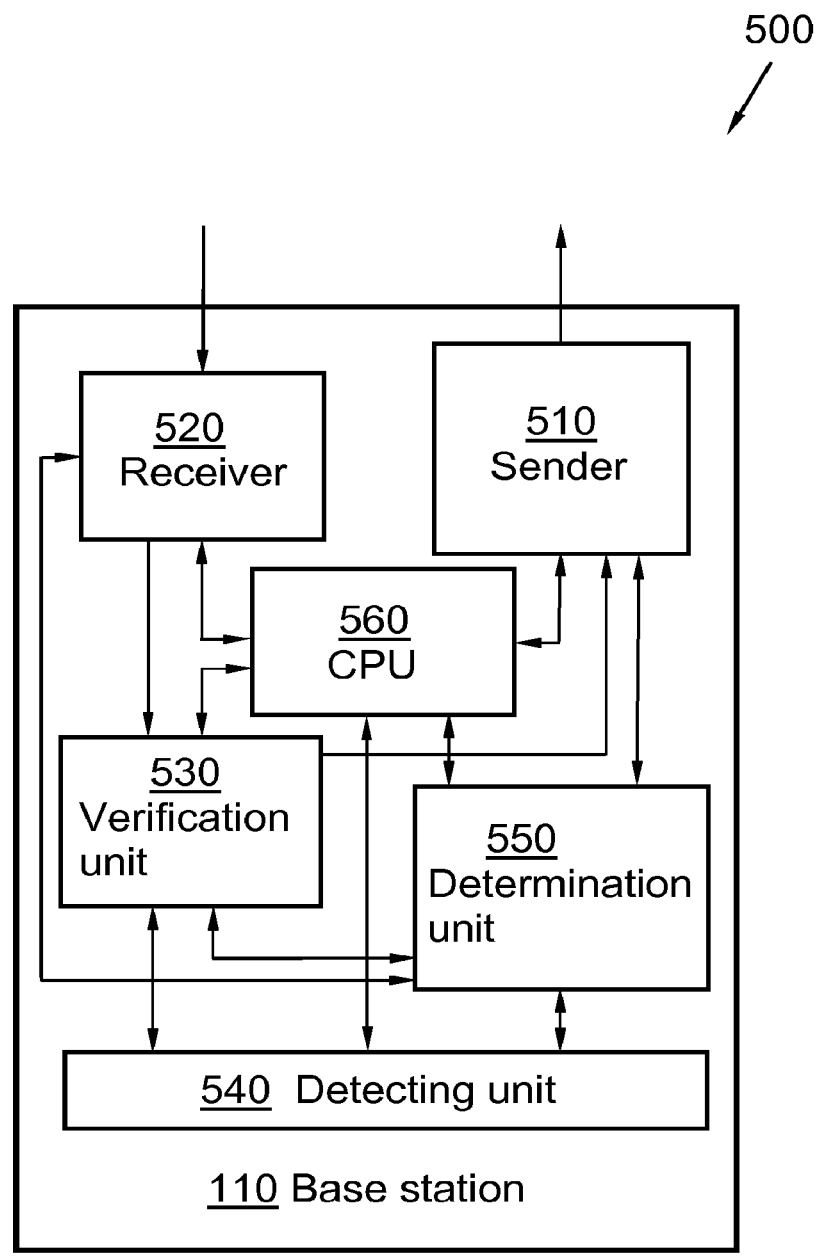
FIG. 5 is a schematic block diagram illustrating embodiments of a base station arrangement.

FIG. 5 schematically illustrates an arrangement 500 in a base station 110. The arrangement 500 is adapted to perform the method steps 401-407 in order to schedule user equipments 120, 122 in a cell 130. The base station 110 and the user equipments 120, 122 are comprised in a wireless communication system 100. The wireless communication system 100, the base station 110 and the user equipments 120, 122 are adapted for contention based transmissions. The base station 110 is adapted to schedule the communication from the user equipments 120, 122 by sending contention based grants. Each contention based grant comprises information indicating if the contention based grant should be used for initial transmission or for retransmission. The base station 110 is adapted to serve a plurality of user equipments 120, 122 within the cell 130. The wireless communication system 100 may be e.g. a LTE radio network and the base station 110 may be e.g. an evolved node B, eNB, according to some embodiments.

In order to perform the method steps 401-407 correctly, the base station arrangement 500 comprises e.g. a transmitter 510, adapted to send a contention based grant, and to send transmission feedback to a plurality of user equipments 120, 122 within the cell 130. The transmission feedback may be an ACK or a NACK. Also, the arrangement 500 comprises a receiver 520. The receiver 520 is adapted to receive data from at least one user equipment 120, 122. In addition, the arrangement 400 comprises a verification unit 530, adapted to verify if the data is correctly received from at least one user equipment 120, 122. Additionally, the arrangement 500 comprises a detecting unit 540, adapted to detect if data is not correctly received due to a collision. Furthermore, the arrangement 500 comprises a determination unit 550, adapted to generate feedback and set information to be associated with each contention based grant, by setting a status bit or by selection of CB-RNTI to indicate if the contention based grant is to be used for initial transmission or retransmission.

The arrangement 500 may also comprise a feedback unit. The feedback unit may be adapted to generate acknowledgement feedback ACK if it is verified that data has been correctly received from at least one user equipment 120, 122. The feedback unit may further be adapted to generate non-acknowledgement feedback NACK if no data is correctly received from any user equipment 120, 122.

The arrangement 500 may further comprise a processing unit 560 which may be represented by e.g. a Central Processing Unit (CPU), a processor, a microprocessor, or other processing logic that may interpret and execute instructions. The processing unit 560 may perform data processing functions for inputting, outputting, and processing of data including data buffering and device control functions, such as call processing control, user interface control, or the like.

It is to be noted that any internal electronics of the base station 110 and/or the base station arrangement 500, not completely necessary for understanding the present method according to the method steps 401-407 has been omitted from FIG. 5, for clarity reasons. Further, it is to be noted that some of the described units 510-560 comprised within the arrangement 500 in the base station 110 are to be regarded as separate logical entities but not with necessity separate physical entities. To mention an example, the receiving unit 520 and the transmitting unit 510 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 110 and the user equipments 120, 122 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 401-407 in the base station 110 may be implemented through one or more processor units 560 in the base station 110, together with computer program code for performing the functions of the present method steps 401-407. Thus a computer program product, comprising instructions for performing the method steps 401-407 in the base station 110 may schedule user equipments 120, 122 in a cell 130.

The computer program product mentioned above may be provided for instance in the form of a data carrier carrying computer program code for performing the method steps according to the present solution when being loaded into the processor unit 560. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 110 remotely, e.g. over an Internet or an intranet connection.

Further, a computer program product comprising instructions for performing at least some of the method steps 401-407 may be used for implementing the previously described method in the base station 110 for providing feedback to user equipments 120, 122 in a cell 130, when the computer program product is run on a processing unit 560 comprised within the base station 110.

Figure 6:
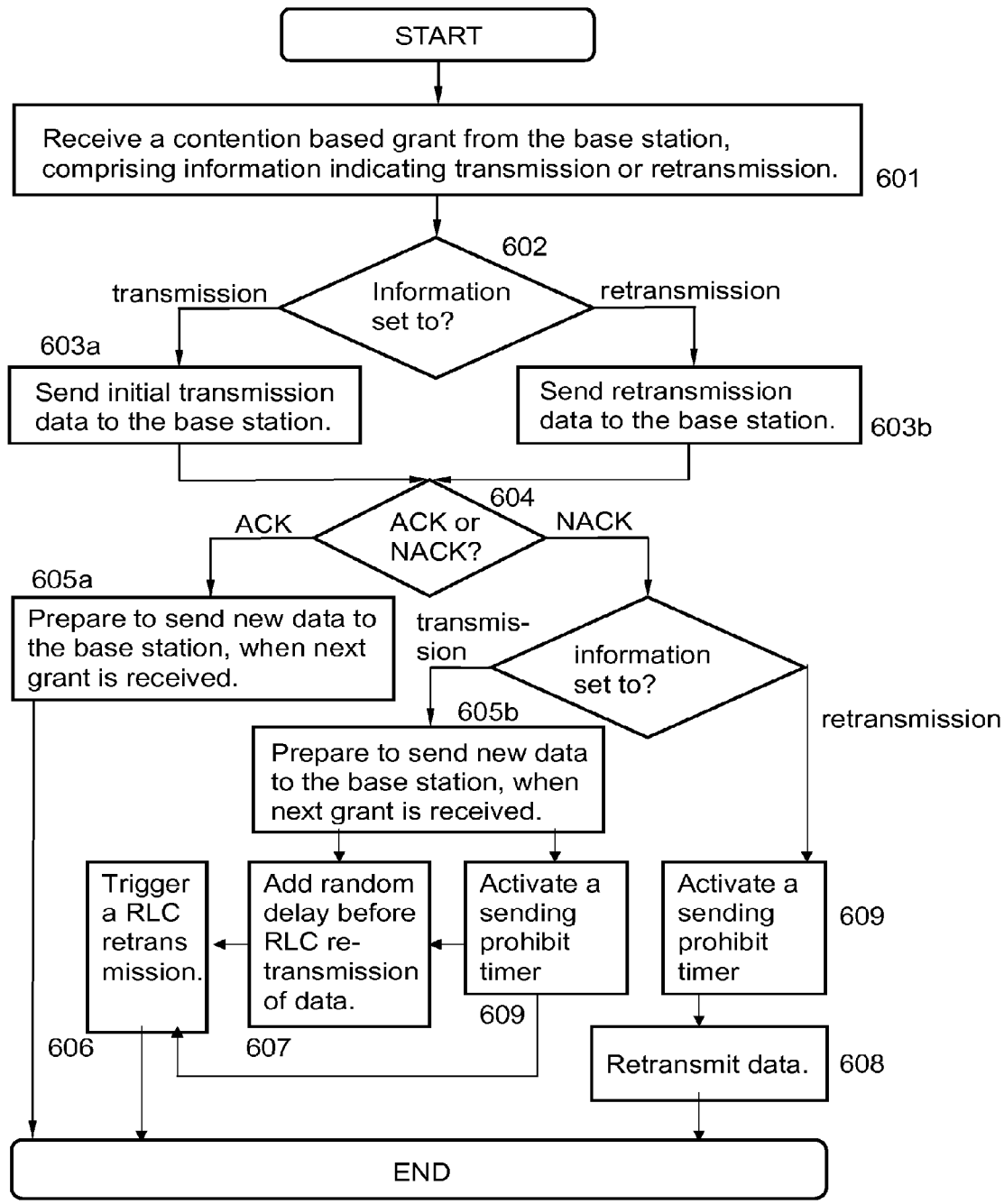
FIG. 6 is a flow chart illustrating embodiments of a method in a user equipment.

FIG. 6 is a flow chart illustrating embodiments of method steps 601-609 performed in a user equipment 120 for assisting a base station 110 in scheduling user equipments 120, 122 in a cell 130. The base station 110 and the user equipments 120, 122 are comprised in a wireless communication system 100. The wireless communication system 100, the base station 110 and the user equipments 120, 122 are adapted for contention based transmissions. The base station 110 is adapted to schedule the communication from the user equipments 120, 122 by sending contention based grants. A contention based grant comprises information indicating if the contention based grant should be used for initial transmission or for retransmission. The wireless communication system 100 may be e.g. a LTE radio network and the base station 110 may be e.g. an evolved node B, eNB, according to some embodiments. The user equipment 120 may be restricted to use the received contention based grant only for transmitting data for the first time within a process, i.e. initial transmission, if the information comprised therein indicates that the contention based grant is to be used for initial transmission.

To appropriately send data packets and receive ACK/NACK and contention based grants from the base station 110 concerning the reception status of the sent data packets, the method may comprise a number of method steps 601-609.

It is to be noted that the method steps 601-609 may be performed in a somewhat different chronological order and that some of them, e.g. step 604 and step 605, may be performed simultaneously or in an altered chronological order. Further, it is to be noted that some method steps e.g. step 604, 605, 606, 607, 608 and step 609 are optional and may only be performed within some embodiments. The method may comprise the following steps:

Step 601
A contention based grant comprising information indicating if the grant should be used for initial transmission or for retransmission is received from the base station 110.

Step 602
It is detected whether the grant should be used for initial transmission or for retransmission, for example if a state bit comprised in the received contention based grant is set to the first value or to the second value.

Step 603
Data is sent to the base station 110. The data is sent according to the information provided with the received contention based grant, such that data to be sent to the base station 110 is initial transmission data if for example a state bit is detected to be set to the first value, and retransmission data if the state bit is detected to be set to the second value.

Step 604
An acknowledgement feedback ACK or non-acknowledgement feedback NACK from the base station 110 may be received.

Step 605
This step is optional and may only be performed within some embodiments.

New data to be sent to the base station 110 may be prepared, when next contention based grant of the same retransmission process as the first grant is received, if the information provided with the following contention based grant, e.g. a state bit, is detected to indicate that the contention based grant should be used for initial transmission according to some embodiments.

Step 606
This step is optional and may only be performed within some embodiments.

A radio link control retransmission may be triggered if a NACK is received and the information provided with the following contention based grant of the same retransmission process as the first grant is detected to indicate that said grant should be used for initial transmission according to some embodiments.

Step 607
According to some embodiments, a random delay may be added before the radio link control, RLC, retransmission of data is performed in order to spread the RLC retransmission in time.

Step 608
A retransmission of data, such as e.g. a HARQ retransmission may be performed if a NACK is received and the next contention based grant of the same retransmission process as the received grant comprises information that is detected to indicate that the contention based grant should be used for re-transmission, e.g. a state bit is set to a second value.

Step 609
This step is optional and may only be performed within some embodiments.

If a NACK is received, a sending prohibit timer 790 may be activated for the purpose of load controlling, which sending prohibit timer 790 prevents the user equipment 120 from using any contention based grants received from the base station 110 before the sending prohibit timer 790 has timed out.

This optional step may be performed regardless of whether the NACK was caused by a collision, see step 606, whereby an RLC retransmission is performed, or if a collision did not occur, see step 608, whereby a HARQ retransmission is performed.

The optional sending prohibit timer 790 may be arranged to be deactivated when a dynamic grant, dedicated to the user equipment 120, is received, according to some embodiments.

In a specific embodiment, the sending prohibit timer may be set to zero.

Figure 7:
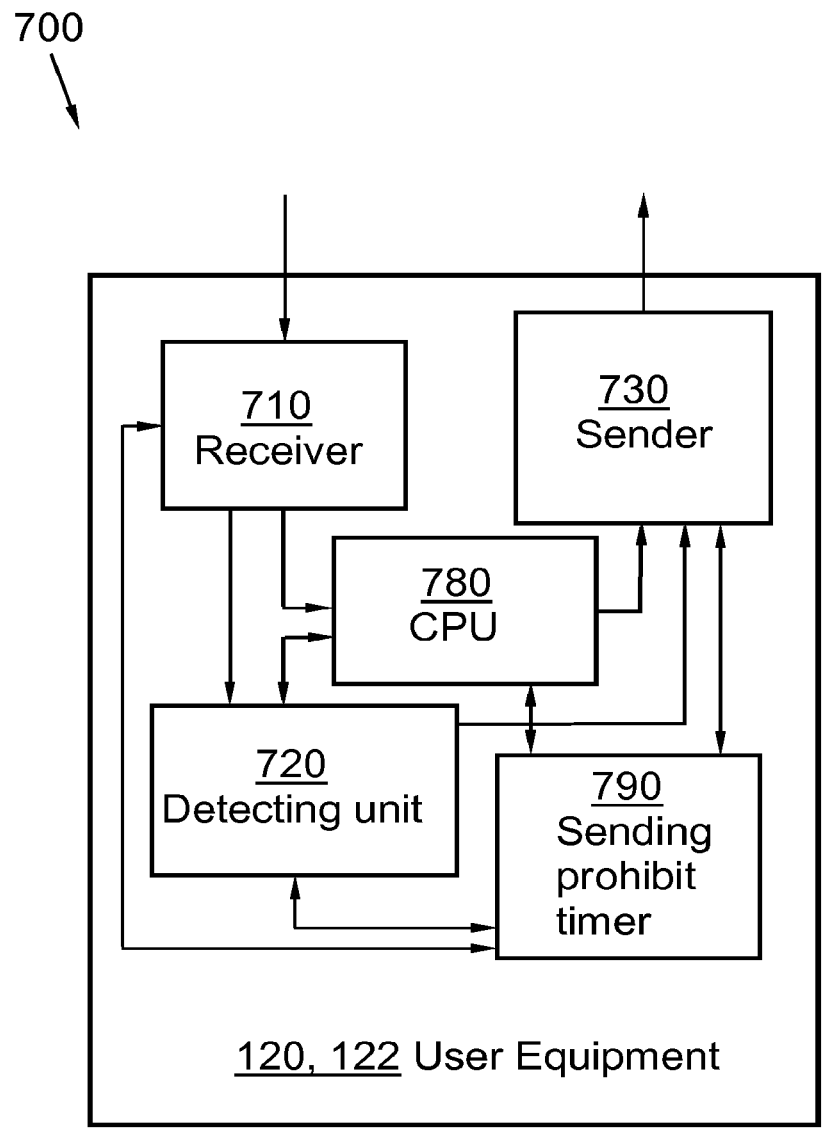
FIG. 7 is a schematic block diagram illustrating embodiments of a user equipment arrangement.

FIG. 7 schematically illustrates an arrangement 700 in a in a user equipment 120. The arrangement 700 is adapted to perform the method steps 601-609. Thus the user equipment arrangement 700 is adapted to receive feedback from a base station 110 concerning the reception status of data sent to the base station 110, and contention based grants. The base station 110 and the user equipment 120 are comprised in a wireless communication system 100 adapted for contention based transmissions. The base station 110 is adapted to schedule communication from the user equipments 120, 122 by sending contention based grants. Each contention based grant comprises information indicating if the contention based grant should be used for initial transmission or retransmission. The information may according to some embodiments be a state bit, which state bit is adapted to be set to a first value or to a second value. Alternatively, the information may be transferred by selection of different CB-RNTI:s dependent on if the contention based grant should be used for initial transmission or retransmission. The base station 110 is adapted to serve a plurality of user equipments 120, 122 within a cell 130. The user equipment 120 may be a mobile terminal such as e.g. a mobile phone. The wireless communication system 100 may be e.g. a LTE radio network.

In order to perform the method steps 601-609, the arrangement 700 comprises units such as e.g. a receiver 710, adapted to receive a contention based grant comprising information indicating if the contention based grant should be used for initial transmission or retransmission, and also acknowledgement feedback ACK or non-acknowledgement feedback NACK from the base station 110. Additionally, the arrangement 600 comprises a detecting unit 720, adapted to detect if the information comprised in the received contention based grant is set to indicate if the contention based grant should be used for initial transmission or retransmission, for example if a state bit is set to a first value or to a second value. Also, the arrangement 700 comprises a transmitter, adapted to send data to the base station 110.

The arrangement 700 may further comprise a processing unit 780, which may be represented by e.g. a Central Processing Unit (CPU), a processor, a microprocessor, or other processing logic that may interpret and execute instructions. The processing unit 780 may perform data processing functions for inputting, outputting, and processing of data including data buffering and device control functions, such as call processing control, user interface control, or the like.

Furthermore, according to some embodiments, the arrangement 700 may also comprise a sending prohibit timer 790. The optional sending prohibit timer 790 may be adapted to prohibit the user equipment 120 from using any received contention based grant within a certain time. According to some embodiments, the sending prohibit timer 790 becomes activated when the user equipment 120 receives a NACK from the base station 110. When activated, the sending prohibit timer 790 may prohibit the user equipment 120 from using any contention based resources i.e. contention based grants for sending any data. The sending prohibit timer 790 may be valid over a fixed, predetermined period of time, or it may be active until the next dynamic grant for the user equipment 120 is received. When the sending prohibit timer 790 is running, the user equipment 120 may be able to do a scheduling request on the Physical Uplink Control CHannel (PUCCH). The scheduling request may be used by the user equipment 120 to request allocation of uplink resources when having data ready for transmission, but no resource grant for use of the Physical Uplink Shared CHannel (PUSCH).

Additionally, the user equipment 120 may comprise a buffer or another memory for storing data for transmission. The data can for example be received from an application executed in the user equipment 120. A controller which may be implemented in the processor 780, may select e.g. a resource block responsive to the status of the buffer, e.g. when data for transmission is detected, and the allocation determined by the processor 780, i.e. when it is detected that the resource block can be used by a plurality of user equipments 120, 122 comprising the present user equipment 120. The data may then be forwarded to the transmitter 720, e.g. using a physical layer of the user equipment 120, and at least a first part of the data may be transmitted using the resource block selected by the controller.

It is to be noted that any internal electronics of the user equipment 120 and/or the user equipment arrangement 700, not completely necessary for understanding the present method according to the method steps 601-609 has been omitted from FIG. 7, for clarity reasons. Further, it is to be noted that some of the described units 710-790 comprised within the arrangement 700 in the user equipment 120 are to be regarded as separate logical entities but not with necessity separate physical entities. To mention an example, the receiver 710 and the transmitter 720 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 110 and the user equipments 120, 122 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The mechanism for sending and/or receiving data packets and sending/receiving ACK/NACK acknowledgements and contention based grants may be implemented through one or more processors 780 in the user equipment arrangement 700 depicted in FIG. 7, together with computer program code for performing the method steps 601-609 of the present solution. The program code mentioned above may also be provided as a computer program product, for instance in the form of a data carrier carrying computer program code for performing the present solution when being loaded into the user equipment 120. One such carrier may be in the form of a memory stick. It is however feasible with other data carriers. The computer program code may furthermore be provided as program code on a server and downloaded to the user equipment 120 remotely.

When using the formulation "comprise" or "comprising" it is to be interpreted as non-limiting, i.e. meaning "consist at least of". The present invention is not limited to the above described preferred embodiments. Various alternatives, modifications and equivalents may be used.

The invention claimed is:

1. A method in a base station for scheduling user equipments, the method comprising:
sending a contention based grant of a retransmission process to a set of user equipments within a cell served by the base station;
receiving data from at least one of the set of user equipments using the contention based grant;

determining whether the data is correctly received from the at least one user equipment; and responsive to determining that the data is not correctly received, the method further comprising the steps:

sending a non-acknowledgement feedback to the set of user equipments; and responsive to detecting whether the data was not correctly received due to a collision, sending a following contention based grant belonging to the same retransmission process as the first contention based grant to the set of user equipments, wherein the following contention based grant comprises information, based on the detecting step, indicating whether the following contention based grant should be used for initial transmission by non-colliding user equipments that have not previously transmitted data pursuant to the first contention based grant or for retransmission by the at least one user equipment that has previously transmitted data pursuant to the first contention based grant.

2. The method according to claim 1, wherein the information indicates that the following contention based grant is to be used for initial transmission in response to detecting that the data was not correctly received due to the collision.

3. The method according to claim 1, wherein the information indicates that the following contention based grant is to be used for retransmission if the data was not correctly received in an absence of collision.

4. The method according to claim 1, wherein the information indicating whether the following contention based grant should be used for initial transmission or for retransmission is provided as one of an identifier used to address the user equipments and a state bit indicator; wherein a first value of the state bit indicator indicates that the following contention based grant should be used for initial transmission and a second value of the state bit indicator indicates that the following contention based grant should be used for retransmission.

5. The method according to claim 4, wherein the state bit indicator is a New Data Indicator.

6. The method according to claim 4, wherein the identifier used to address the user equipments is a Contention Based-Radio Network Temporary Identifier "CB-RNTI", and wherein different CB-RNTIs are used for indicating if the following contention based grant should be used for initial transmission or for retransmission.

7. A base station for scheduling user equipments in a cell, the base station comprising:

a transmitter, wherein the transmitter sends contention based grants and feedback to a set of user equipments within the cell served by the base station;

a receiver, wherein the receiver receives data from at least one of the set of user equipments;

wherein the base station determines whether the data is correctly received from the at least one of the set of user equipments, detects whether the data was not correctly received due to a collision, generates feedback for transmission by the transmitter, and wherein the base station further sets information comprised in a following contention based grant which indicates whether the following contention based grant should be used for initial transmission or for retransmission, and wherein:

responsive to determining that the data is not correctly received and the collision is detected, the information in the following contention based grant is set to indicate that the following contention based grant is to be used for initial transmission by non-colliding user equipments that have not previously transmitted data pursuant to the first contention based grant; or responsive to determining that the data is not correctly received in an absence of collision, the information in the following contention based grant is set to indicate that the following contention based grant is to be used for retransmission by the at least one user equipment that has previously transmitted data pursuant to the first contention based grant.

8. A method in a user equipment for assisting in scheduling of user equipments in a cell served by a base station, the method comprising:

receiving a following contention based grant from the base station belonging to a same retransmission process as a first contention based grant sent before the following contention based grant, wherein the following contention based grant comprises information indicating whether the following contention based grant should be used for initial transmission or retransmission, wherein the information is an identifier used to address the user equipment;

detecting the information comprised in the contention based grant, and sending data to the base station using said following contention based grant, according to the identifier used to address the user equipment, wherein the data is sent as the retransmission if the data was also sent by the user equipment in response to the first contention based grant in an absence of collision, or wherein the data is sent as the initial transmission by the user equipment if the data was not sent in response to the first contention based grant.

9. The method according to claim 8, wherein the identifier used to address the user equipment is a Contention Based-Radio Network Temporary Identifier "CB-RNTI", and wherein different CB-RNTIs are used for indicating if the contention based grant should be used for initial transmission or for retransmission.

10. The method according to claim 8, further comprising:

if a non-acknowledgement feedback is received and the information comprised in the following grant of the same retransmission process as the first grant indicates that the grant should be used for initial transmission, triggering a radio link control retransmission.

11. The method according to claim 10, further comprising at least one of:

adding a random delay before the radio link control retransmission of data is performed and activating a sending prohibit timer, which sending prohibit timer prevents the user equipment from using any contention based grants received from the base station before the sending prohibit timer has timed out.

12. The method according to claim 11, wherein the sending prohibit timer is arranged to be deactivated when a dynamic grant, dedicated to the user equipment, is received.

13. The method according to claim 8, further comprising:

if a non-acknowledgement feedback is received and the information comprised in the following grant of the same retransmission process as the first grant indicates that the grant should be used for retransmission, performing a retransmission of the data with a Hybrid Automatic Repeat Request retransmission.

14. User equipment for assisting in scheduling of user equipments in a cell served by a base station, the user equipment comprising:
- a receiver, wherein the receiver receives a following contention based grant from the base station, wherein the following contention based grant belongs to the same retransmission process as a first contention based grant sent before the following contention based grant, wherein the following contention based grant comprises information indicating whether the following contention based grant should be used for initial transmission or for retransmission, wherein the information is an identifier used to address the user equipment;
- a transmitter, wherein the transmitter transmits data to the base station using said following contention based-grant, according to the identifier used to address the user equipment; and
- wherein the user equipment detects the information, and
- wherein the user equipment sends the data as the retransmission if the data was also sent by the user equipment in response to the first contention based grant in an absence of collision, or
- wherein the user equipment sends the data as the initial transmission if the data was not sent in response to the first contention based grant.

15. The user equipment of claim 14, wherein the identifier used to address the user equipment is a set of CB-RNTIs, wherein different CB-RNTIs are used for indicating if a following contention based grant should be used for initial transmission or for retransmission.

16. The user equipment of claim 14, further adapted to trigger a radio link control retransmission if a non-acknowledgement feedback is received and the information comprised in the following grant of the same retransmission process as the first grant indicates that the grant should be used for initial transmission.

17. The user equipment of claim 16, further adapted to add a random delay before the radio link control retransmission of data is performed.

18. The user equipment of claim 16, further adapted to activate a sending prohibit timer, which sending prohibit timer prevents the user equipment from using any contention based grants received from the base station before the sending prohibit timer has timed out.

19. The user equipment of claim 18, further adapted to deactivate the sending prohibit timer when a dynamic grant, dedicated to the user equipment, is received.

20. The user equipment of claim 14, further adapted to perform a retransmission of the data with a Hybrid Automatic Repeat Request retransmission if a non-acknowledgement feedback is received and the information comprised in the following grant of the same retransmission process as the first grant indicates that the grant should be used for retransmission.

* * * * *